No. 731,132. PATENTED JUNE 16, 1903.
A. J. SACKETT.
CARRIER FOR MANUFACTURING FERTILIZER.
APPLICATION FILED FEB. 9, 1903.
NO MODEL. 2 SHEETS—SHEET 2.

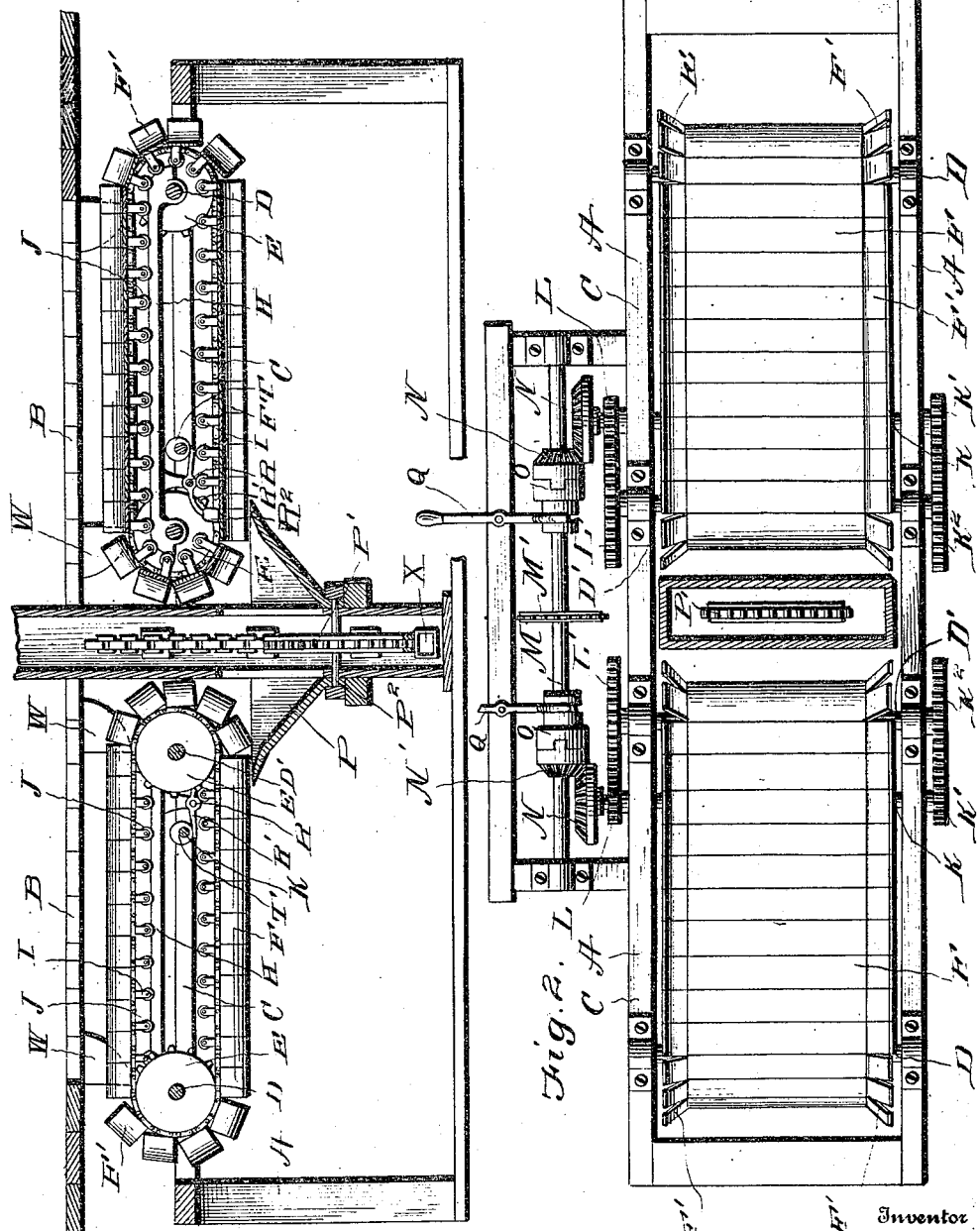

Witnesses
R. A. Boswell
N. A. Mayhew

Inventor
Augustin J. Sackett
By A. L. Hung
Attorney

No. 731,132. Patented June 16, 1903.

UNITED STATES PATENT OFFICE.

AUGUSTUS J. SACKETT, OF BALTIMORE, MARYLAND.

CARRIER FOR MANUFACTURING FERTILIZER.

SPECIFICATION forming part of Letters Patent No. 731,132, dated June 16, 1903.

Application filed February 9, 1903. Serial No. 142,624. (No model.)

*To all whom it may concern:*

Be it known that I, AUGUSTUS J. SACKETT, a citizen of the United States, residing at Baltimore, in the State of Maryland, have invented certain new and useful Improvements in Batcher-Carriers for Manufacturing Fertilizer; and I do hereby declare the following to be a full, clear, and exact description of the invention, such as will enable others skilled in the art to which it appertains to make and use the same.

This invention relates to new and useful improvements in fertilizer-manufacturing machines comprising apparatus for conveying by endless carriers fertilizer and depositing the same in a hopper or elevator, suitable means being provided for jarring off any fertilizer that might have a tendency to cling to the plates of the carrier, and in the provision of hinged doors, which are mounted near the ends of the carriers to prevent the material running out the ends and guiding the same to the elevator and so arranged as to yield against an excessive pressure that might be brought to bear upon the same.

The invention consists, further, in various details of construction and in combinations and arrangements of parts, which will be hereinafter fully described and then specifically defined in the appended claims.

My invention is clearly illustrated in the accompanying drawings, which, with the letters of reference marked thereon, form a part of this application, and in which—

Figure 3:
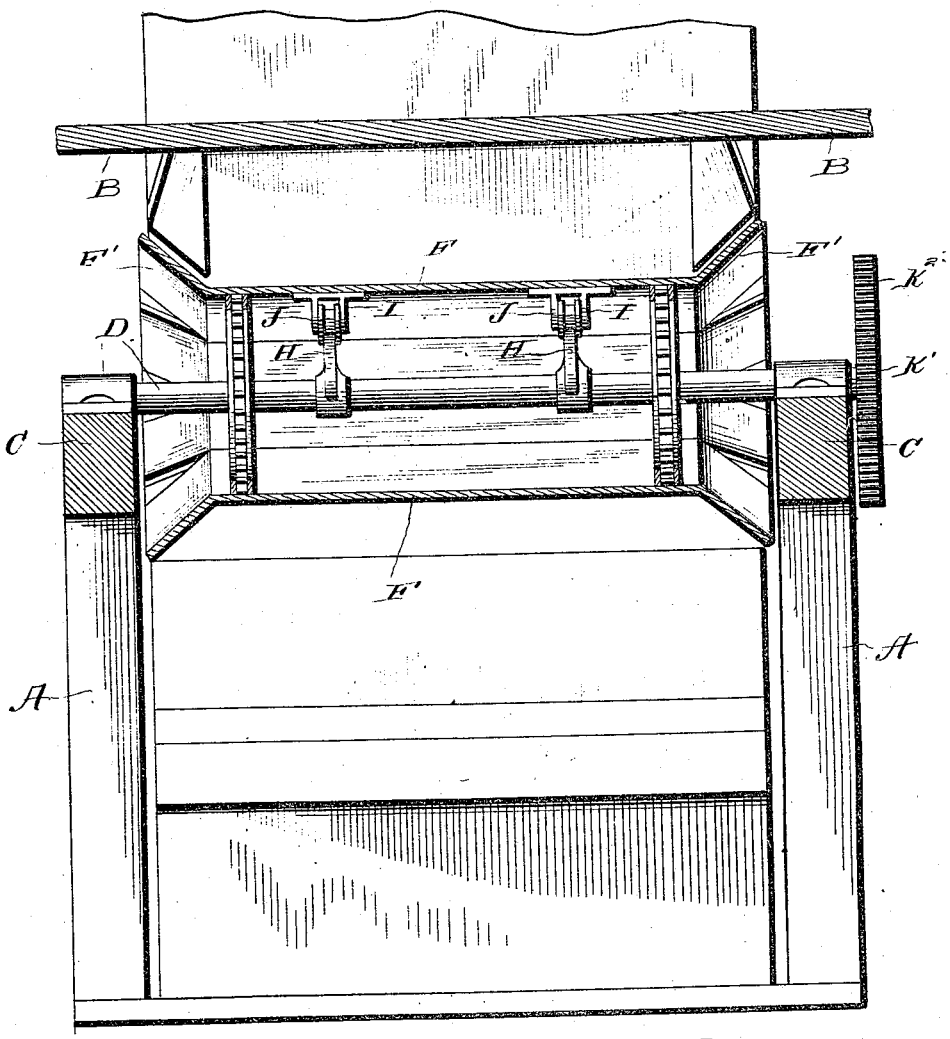
Figure 4:
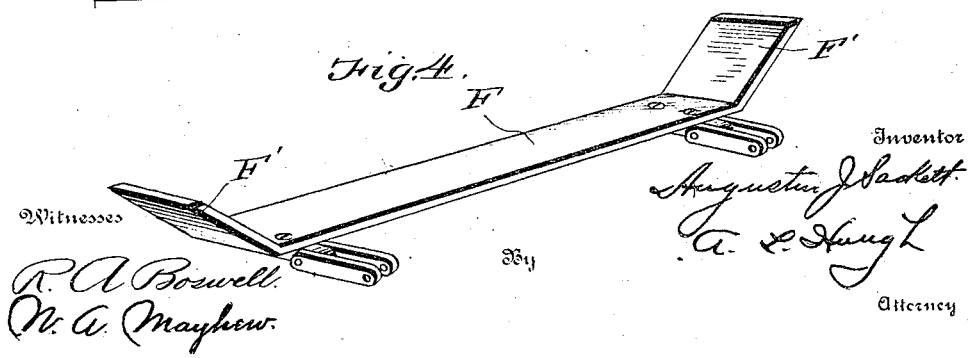

Figure 1 is a vertical sectional view through my improved carrier-batcher. Fig. 2 is a top plan view. Fig. 3 is an end elevation. Fig. 4 is a detail view of one of the carrier-plates.

Reference now being had to the details of the drawings by letter, A designates the frame of the apparatus, which is positioned, preferably, a slight distance below the floor B, and mounted in the beams C of the framework are the shafts D and D', and secured to said shafts are the sprocket-wheels E, arranged in pairs, as shown in the top plan view of the drawings, and mounted to travel about said sprocket-wheels is an endless carrier made up of plates F. Said plates extend, preferably, the width of the carrier and have their ends beveled, as shown at F', thus forming a means for retaining the batch of fertilizer upon the same as it is carried forward to be dumped in a hopper, from which it is conveyed away by an elevator. Mounted upon the frame are the tracks H, the ends of which are curved, as at H', and secured to the under surface of each plate is a bracket I, between the lugs of which are mounted wheels J, which are preferably flanged and adapted to travel upon said tracks. In the drawings there are shown two wheels secured to each plate opposite each other and mounted on the tracks, as shown.

Mounted upon a shaft K, which is journaled in suitable bearings in the frame of the machine, is a pinion-wheel K', which is in mesh with a pinion-wheel K², mounted to rotate with the shaft D', and on the opposite end of the shaft K is fixed a pinion-wheel L, which is in mesh with a gear-wheel L' on the end of the shaft D', said shaft K being driven by means of a bevel-gear N, fixed to one end of the shaft, which is in mesh with a bevel-pinion N', keyed to rotate with the shaft M. Said shaft M, which is journaled in suitable bearings upon the frame of the machine, has fixed thereto a sprocket-wheel M', which may be driven by connection with any suitable power. Splined upon said shaft M are the clutch members O, there being two of said clutch members which are adapted to mesh with the bevel-wheels M', it being understood that I provide in my apparatus two carriers similarly constructed and which are geared together in the manner illustrated in the drawings. Fastened to said clutch members are suitable operating-handles Q, whereby one or the other of the carriers may be thrown into operation at the pleasure of the operator.

Mounted upon a shaft R, supported by the framework of the mechanism, is a lever R', which has a hammer-head R² upon one end, the other end of which lever is positioned in the path of the cam-wheel, rotating with the shaft T. Said hammer is so positioned that at each rotary movement of the cam-wheel it will strike against the under surface of the plate of the carrier, thus imparting a jar thereto for the purpose of loosening any fertilizer that may cling to the plate.

In order to prevent the fertilizer from falling out over the ends of the sprocket-wheels, I provide deflecting-plates W, the ends of which are preferably angled to guide the material, and these plates are arranged near the ends of the carrier and adjacent to the elevator. Intermediate the two carriers is a hopper P, and a sprocket-wheel P' is journaled in suitable bearings P² near the lower end of the hopper, and about said wheel P' is adapted to pass an endless chain having buckets X, the other end of the carrier passing about the sprocket-wheel being adapted to pass over a similar sprocket-wheel, (not shown,) by which elevator the material may be conveyed away to any suitable location.

In operation the material is batched or bedded on the plates of one of the carriers, and when the workmen have accomplished this the clutch on that side is drawn, so that the top plates travel very slowly forward and empty successively into the elevator. The knocker as the carrier is in operation will strike against each plate, imparting a jar thereto which has a tendency to disengage any material that might cling to the plates. While one carrier is in operation the other one may be idle and a single batch or bed formed on the plates of the other carrier, and by alternately operating the clutches the two carriers may be thrown into operation. By arranging the conveyers or carriers a slight distance below the surface of the floor the workmen can easily dump their wheelbarrow loads of fertilizer on the conveyer and the work greatly expedited by the convenience of the arrangement of the apparatus.

While I have shown a particular mechanical construction whereby the features of my invention are disclosed, it will be understood that I may make alterations in the construction of the invention without departing from the spirit of the invention.

Having thus fully described my invention, what I claim as new, and desire to secure by Letters Patent, is—

1. A fertilizer-manufacturing apparatus comprising endless conveyers adapted to be mounted underneath a suitable floor or platform, a hopper intermediate said conveyers, an elevator passing through the hopper, tracks secured to the frame supporting the conveyers, the plates of the conveyers having beveled flanges, bracket-plates secured to the under surface of each plate, and flanged wheels journaled on said tracks, and clutch mechanism for throwing the carriers into and out of gear with suitable driving mechanism, as set forth.

2. A fertilizer-manufacturing apparatus comprising a framework positioned beneath a floor or platform, endless conveyers mounted on said framework, the plates of said conveyers having beveled flanges, deflecting-plates mounted upon the framework and positioned adjacent to the inner ends of the conveyer, a hopper intermediate the conveyers, and an elevator working through said hopper, as set forth.

In testimony whereof I affix my signature in presence of two witnesses.

AUGUSTUS J. SACKETT.

Witnesses:
ENOCH HARLAN,
HARRY L. PRICE.